United States Patent
Perras et al.

(10) Patent No.: US 9,743,326 B2
(45) Date of Patent: Aug. 22, 2017

(54) ANCHOR NODE SELECTION IN A DISTRIBUTED MOBILITY MANAGEMENT ENVIRONMENT

(71) Applicant: InterDigital Patent Holdings, Inc., Wilmington, DE (US)

(72) Inventors: Michelle Perras, Montréal (CA); Alexander Reznik, Pennington, NJ (US); Yuriy Reznik, Seattle, WA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/773,810

(22) PCT Filed: Mar. 13, 2014

(86) PCT No.: PCT/US2014/025533
§ 371 (c)(1),
(2) Date: Sep. 9, 2015

(87) PCT Pub. No.: WO2014/159962
PCT Pub. Date: Oct. 2, 2014

(65) Prior Publication Data
US 2016/0014659 A1 Jan. 14, 2016

Related U.S. Application Data

(60) Provisional application No. 61/782,598, filed on Mar. 14, 2013.

(51) Int. Cl.
*H04W 36/12* (2009.01)
*H04W 48/20* (2009.01)
(Continued)

(52) U.S. Cl.
CPC ......... *H04W 36/12* (2013.01); *H04L 61/1511* (2013.01); *H04L 65/4084* (2013.01);
(Continued)

(58) Field of Classification Search
None
See application file for complete search history.

(56) References Cited

U.S. PATENT DOCUMENTS 7,299,294 B1 * 11/2007 Bruck ............... H04L 29/12216
709/201
8,156,199 B1 4/2012 Hoche-Mong et al.
(Continued)

OTHER PUBLICATIONS

Carlos J. bernardos et al, "Toward Flat and Distributed Mobility management: a 3GPP Evolved network Design" ICC, Jun. 10 2012, pp. 6855-6861, XP032274609.*
(Continued)

*Primary Examiner* — Kodzovi Acolatse
(74) *Attorney, Agent, or Firm* — Condo Roccia Koptiw LLP

(57) ABSTRACT

Systems, methods, and instrumentalities to select a distributed gateway (D-GW). A WTRU may be configured to detect a request for an address associated with content. The WTRU may receive an address list associated with the content. The WTRU may select a distributed gateway (D-GW). If an address of a currently connected D-GW is included in the address list, the WTRU may select the currently connected D-GW. If the address of the currently connected D-GW is not in the address list and an address of an anchor D-GW that is not currently connected is included in the address list, the WTRU may select the anchor D-GW that is not currently connected. If the address of the currently connected D-GW is not in the address list and the address of the anchor D-GW that is not currently connected is not in the address list, the WTRU may select the currently connected D-GW.

20 Claims, 8 Drawing Sheets

(51) Int. Cl.
*H04L 29/12* (2006.01)
*H04L 29/06* (2006.01)
*H04W 8/08* (2009.01)
*H04L 29/08* (2006.01)
*H04W 88/16* (2009.01)

(52) U.S. Cl.
CPC ............. H04L 65/80 (2013.01); H04W 48/20 (2013.01); *H04L 67/1002* (2013.01); *H04W 8/082* (2013.01); *H04W 8/087* (2013.01); *H04W 88/16* (2013.01)

(56) References Cited

U.S. PATENT DOCUMENTS

| | | | | |
|---|---|---|---|---|
| 2011/0145111 | A1* | 6/2011 | Ljunggren | G06Q 20/10 705/30 |
| 2012/0259946 | A1 | 10/2012 | Stockhammer et al. | |
| 2013/0195204 | A1* | 8/2013 | Reznik | H04N 19/85 375/240.26 |
| 2013/0282917 | A1* | 10/2013 | Reznik | H04N 21/4402 709/231 |
| 2014/0019593 | A1* | 1/2014 | Reznik | H04L 65/60 709/219 |
| 2014/0307629 | A1* | 10/2014 | Liebsch | H04W 36/0011 370/328 |
| 2015/0055461 | A1* | 2/2015 | Hahn | H04W 48/20 370/230 |

OTHER PUBLICATIONS

Bernardos et al., "PMIPv6-Based Distributed Anchoring", DMM Working Group, draft-bernardos-dmm-distributed-anchoring-01, Sep. 21, 2012, pp. 1-24.

Bernardos et al., "Towards Flat and Distributed Mobility Management: A 3GPP Evolved Network Design ",IEEE International Conference on Communications (ICC), Jun. 10-15, 2012, pp. 6855-6861.

Taleb et al., "DNS-Based Solution for Operator Control of Selected IP Traffic Offload", IEEE, Jun. 5, 2011, 5 pages.

* cited by examiner

ANCHOR NODE SELECTION IN A DISTRIBUTED MOBILITY MANAGEMENT ENVIRONMENT

CROSS-REFERENCE TO RELATED APPLICATION

This application is the U.S. National State of International Patent Application PCT/US2014/025533under 35 U.S.C. § 371 filed on Mar. 13, 2014 and claims the benefit of U.S. Provisional Patent Application Ser. No. 61/782,598, filed Mar. 14, 2013, the content of these applications both of which are incorporated by reference herein.

BACKGROUND

Mobile networks support protocols that may allow user equipment (UE) to remain connected to a network even while moving. Distributed mobility management (DMM) may allow a UE to access one or more anchor nodes as it moves. The UE experiences handover from node to node. One or more servers and/or sources of content may provide a list of uniform resource locators (URLs) of servers comprising encoded segments. Using hypertext transfer protocol (HTTP), the UE may retrieve the content. Multiple versions of an encoded content may be made available at different rates. The versions may be stored as files with different file names on those servers.

The UE may arbitrarily pick one URL corresponding to a content server to use (e.g., the first listed URL). The arbitrary selection of a server and/or source may lead to an inefficient (e.g., non-optimal) data path. The non-optimal path selection may provide unpredictable performance and/or a bad user experience. The UE may subsequently have to repeat the process to obtain suitable performance (e.g., using a round-robin scenario to find a better path), which is inefficient.

SUMMARY

Systems, methods, and instrumentalities are provided to select a distributed gateway (D-GW) via a wireless transmit/receive unit (WTRU). The WTRU may be configured to detect a request for an address associated with content. For example, a dynamic adaptive streaming (DASH) client may send the request for the address associated with content and a management entity may detect it. The WTRU may receive an address list associated with the content. For example, the management entity may send a query to a network entity (e.g., a DNS server) requesting the address list and process the received address list. The WTRU may select a distributed gateway (D-GW), e.g., based on the received address list. If an address of a currently connected D-GW is included in the address list, the WTRU may select the currently connected D-GW. If the address of the currently connected D-GW is not in the address list and an address of an anchor D-GW that is not currently connected is included in the address list, the WTRU may select the anchor D-GW that is not currently connected. If the address of the currently connected D-GW is not in the address list and the address of the anchor D-GW that is not currently connected is not in the address list, the WTRU may select the currently connected D-GW. The selection of the D-GW may be made by the management entity.

The WTRU may (e.g., via the management entity) indicate the selected D-GW. For example, the management entity may indicate the selected D-GW to the DASH client, and, the DASH client may indicate that the selected D-GW is to be used. The WTRU may send a message to the selected D-GW requesting the content. The WTRU may receive the requested content from the selected D-GW.

DETAILED DESCRIPTION

A detailed description of illustrative embodiments are described with reference to the various figures. Although this description provides a detailed example of possible implementations, it should be noted that the details are intended to be exemplary and in no way limit the scope of the application. In addition, the figures may illustrate message charts, which are meant to be exemplary. Other embodiments may be used. The order of the messages may be varied where appropriate. Messages may be omitted if not needed, and, additional flows may be added.

Figure 1A:
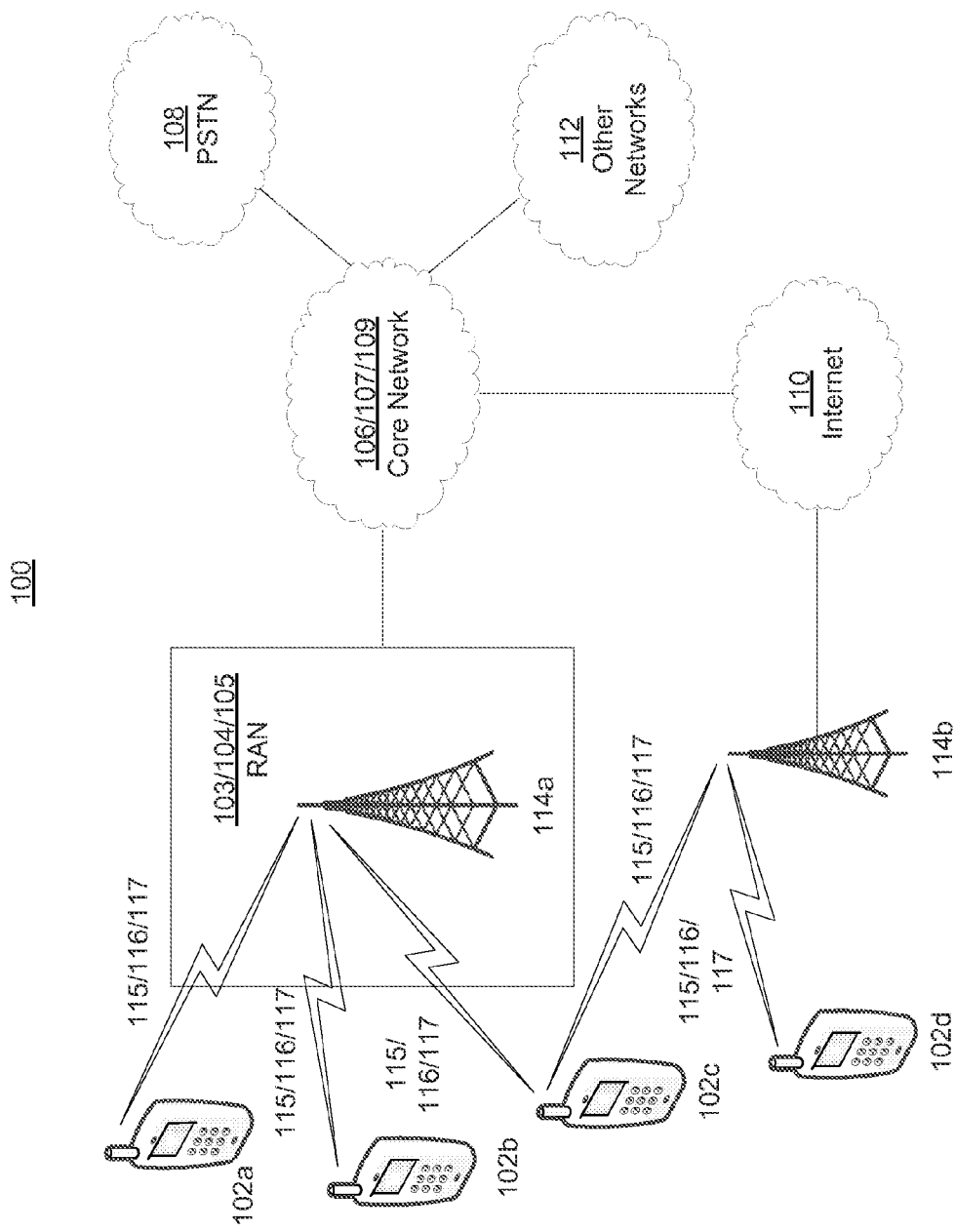
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements.

Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include wireless transmit/receive unit (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117 which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA.).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiment, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over interact protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with a RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include a core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
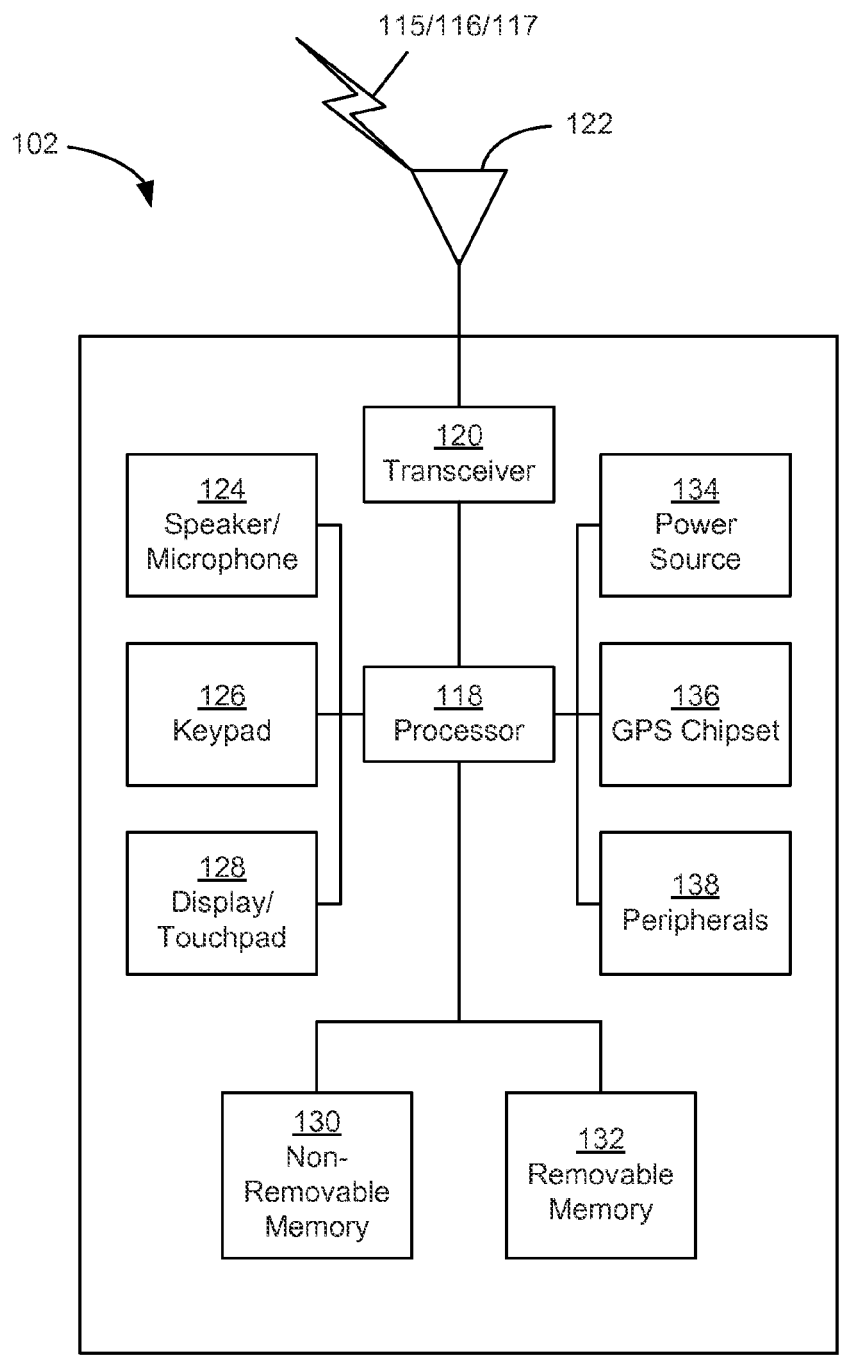
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable Memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/o wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
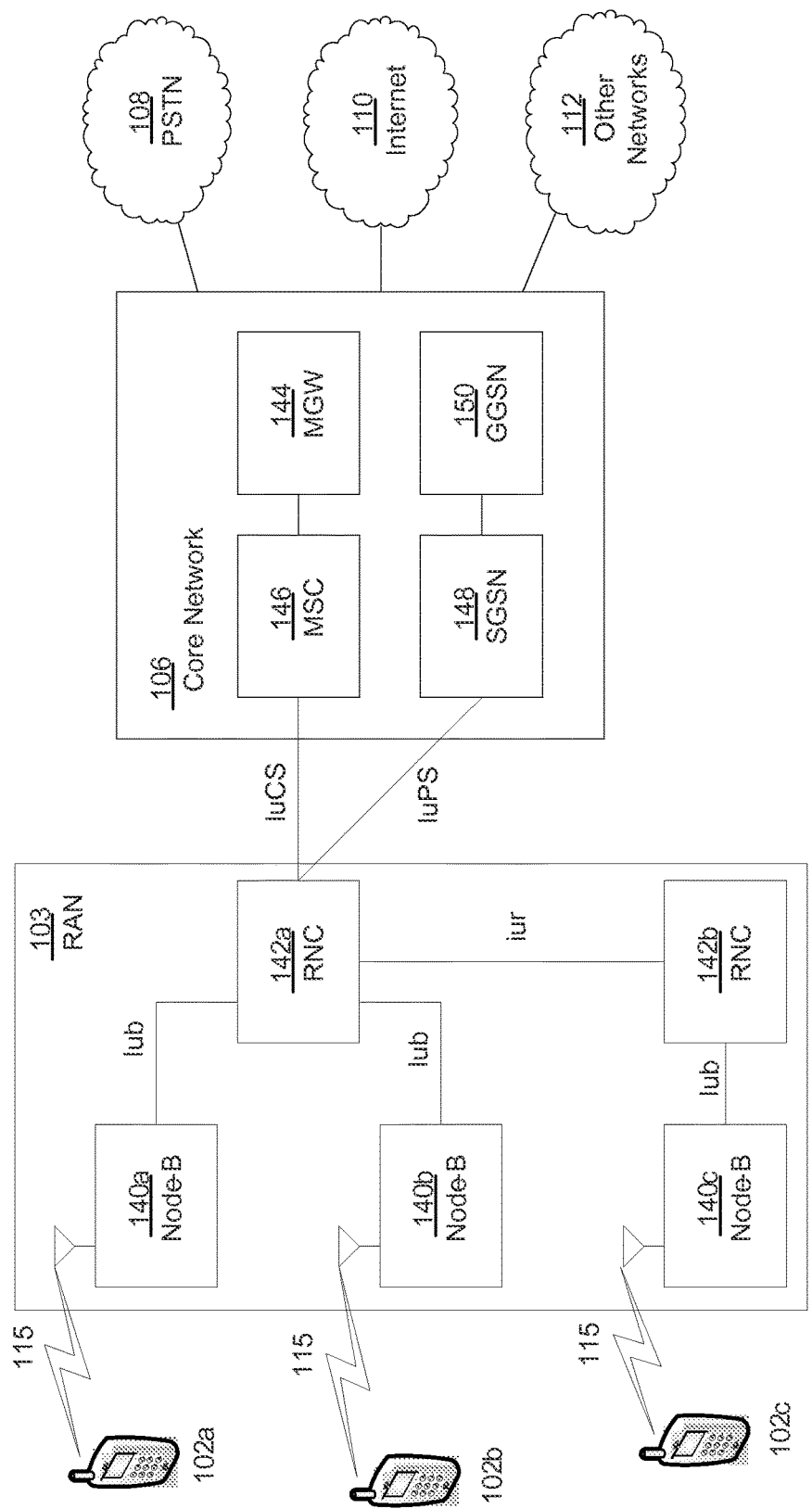
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
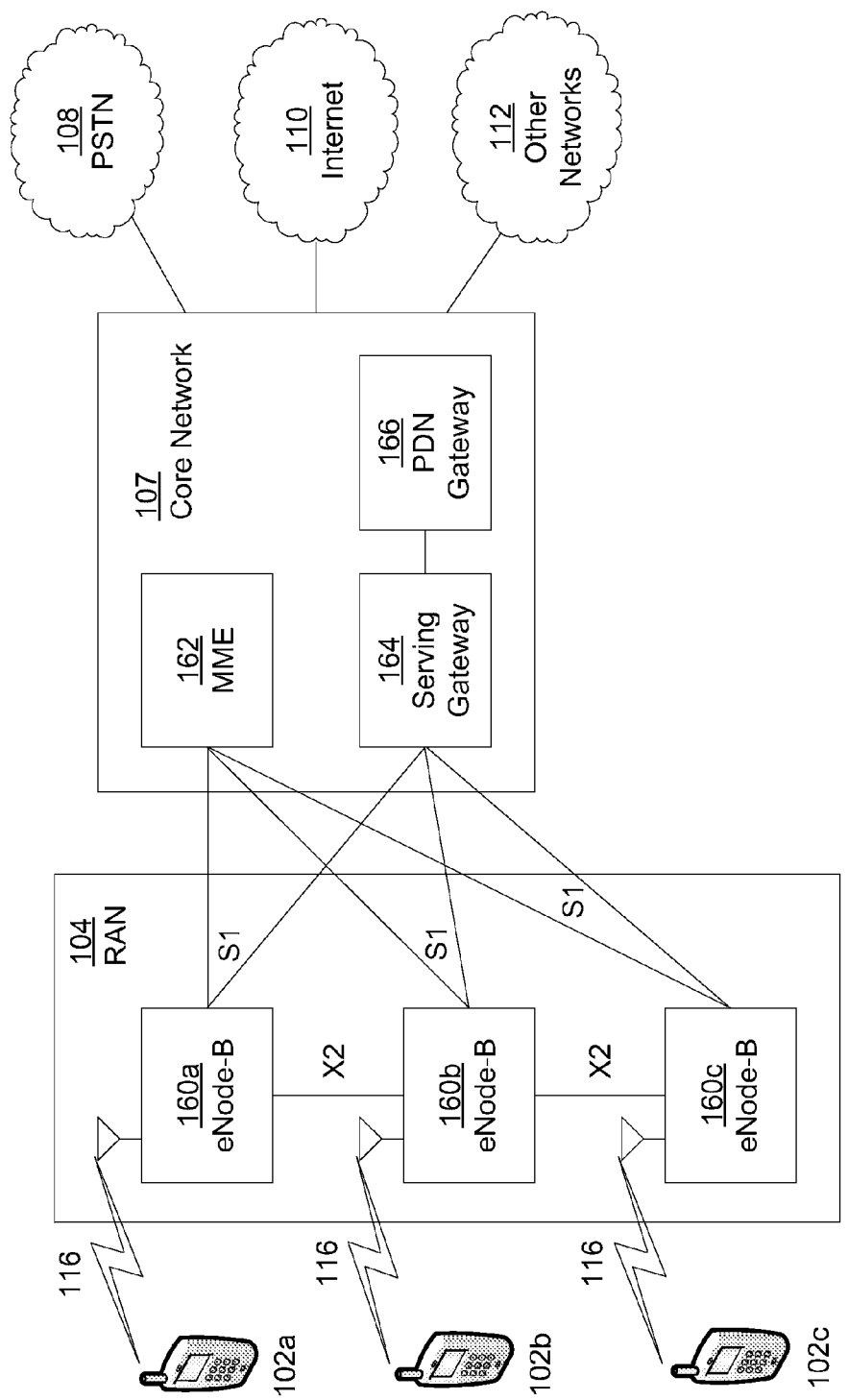
FIG. 1D is a system diagram of an example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 12 may be corrected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode. B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
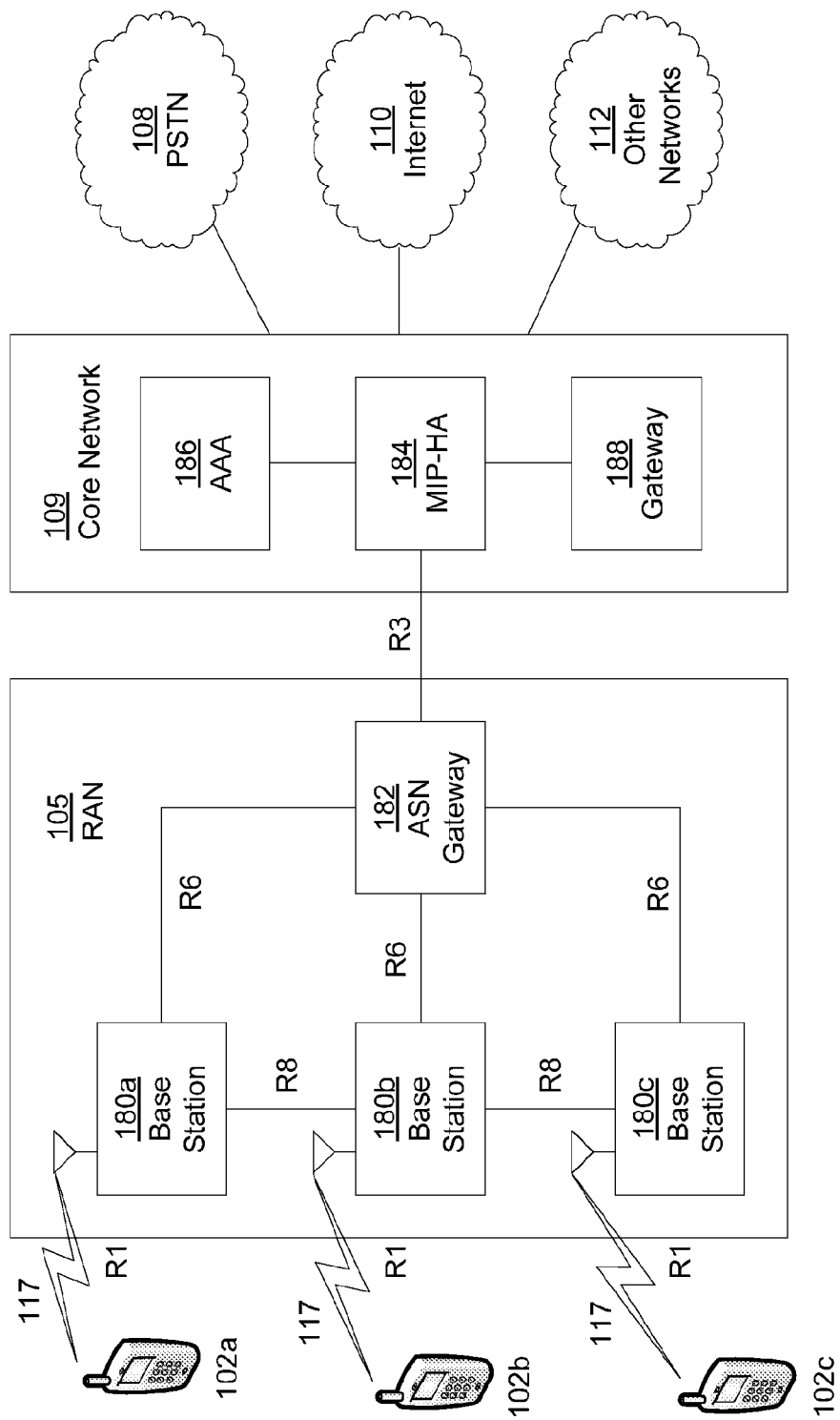
FIG. 1E is a system diagram of an example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102h, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 2:
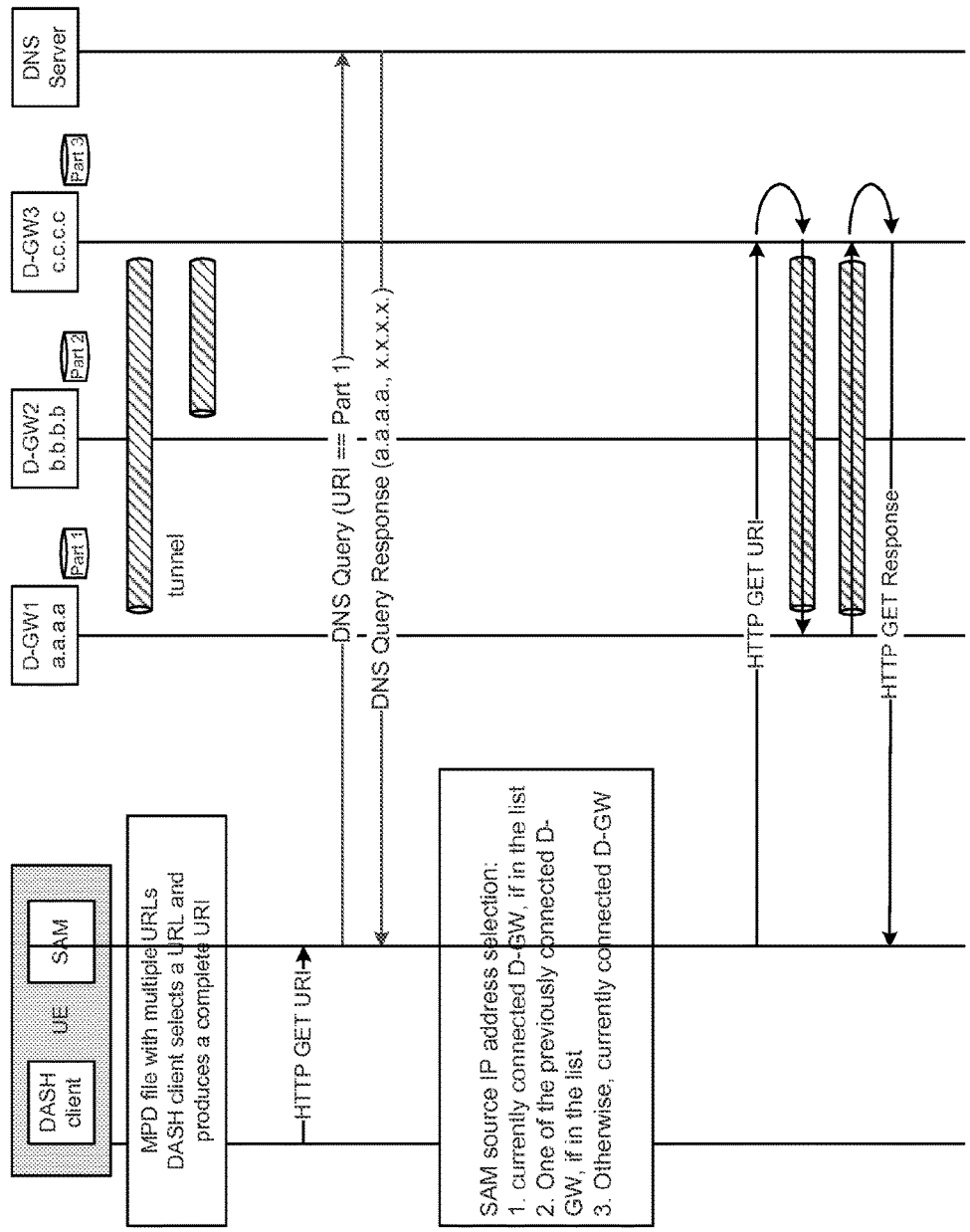
FIG. 2 illustrates an exemplary message chart for anchor node selection by a WTRU when data is distributed, e.g., between one or more DMM gateways.

FIG. 2 illustrates an exemplary message chart for anchor node selection by a WTRU (labeled UE in FIG. 2) with data distributed, e.g., between one or more distributed mobility management (DMM) gateways (GW). A domain name service (DNS) server is illustrated. In DMM, mobility entities (e.g., anchor nodes or GWs) may be close to the UE, and the UE may access different nodes as it moves. DMM may enable an efficient data path by anchoring the UE to a closest anchor node. DMM may include the possibility for a UE to use a single interface, e.g., to handover between access GWs (e.g., using an anchoring functionality). DMM may introduce the configuration of multiple IP addresses onto a single interface on the UE. These IP addresses may be obtained from a single operator or different operators. Using DMM, a UE may handover between D-GWs and maintain connectivity for existing flows (e.g., using tunnels between the previously connected D-GWs and the currently connected D-GW). The UE may create new flows anchored at the currently connected D-GW. IP addresses, for example, obtained from previous anchor nodes may be set to a "deprecating" state, and may be used by existing flows. IP addresses obtained from the currently connected D-GW may be used for new flows. To enable session continuity, DMM may create tunnels between the anchor nodes (e.g., between the currently connected D-GW and previously connected D-GWs).

The UE may comprise a dynamic adaptive streaming over HTTP (DASH) client and an access manager (SAM). The DASH client may comprise logic to manage HTTP streaming. The SAM manager may comprise logic to select IP addresses and/or anchor nodes as will be described.

The UE may be anchored to a plurality of gateways through a series of handovers. D-GW1 represents a node with an address of a.a.a.a, containing Part 1 of data in a database. D-GW2 represents a node with an address of b.b.b.b, containing Part 2 of data in a database. D-GW3 represents a node with an address of c.c.c.c, containing Part 3 of data in a database. The UE may be anchored to all three nodes in FIG. 2, but may be currently connected only to D-GW3. Continuity with the other anchor nodes may be maintained using tunnels.

One or more servers and/or sources of content may provide a media presentation description (MPD) file to the DASH client with uniform resource locators (URLs) of servers comprising encoded segments. The URLs may have multiple BaseURL links. The links may be provided as global <BaseURL> elements. The segment files may be provided as extension URLs. The DASH client may parse the MPD file, inspect the BaseURLs, and select a suitable BaseURL. For each segment, the DASH client may produce a uniform resource identifier (URI) and issue an HTTP GET URI instruction to retrieve corresponding content.

The SAM may make a DNS query (e.g., for Part 1), and may obtain in response multiple IP addresses where the data may be available (e.g., a.a.a.a (D-GW1) and x.x.x.x (an un-contacted D-GW). The SAM may perform the source IP address selection. The SAM may identify the known D-GWs from the DNS response. The SAM may select the current D-GW, if specified in the obtained IP addresses. If the current D-GW is not specified, a D-GW may be selected, e.g., from which the UE may have previously obtained an IP address. In the example of FIG. 2, D-GW1, previously connected, and still anchored, may be selected. If no connected or anchored D-GWs is specified in the list, the current D-GW may be selected.

Deprecated IP addresses on the UE may not be released immediately, when no flows are using the IP addresses. The SAM may know the D-GW that may have assigned an IP address. The SAM may select the D-GW with the local content as anchor even if the UE may not be directly connected to this D-GW.

The UE may issue an HTTP GET URI instruction to the selected D-GW1, via the currently connected D-GW3, which redirects the request through the tunnel to D-GW1 (e.g., since a.a.a.a was in the DNS response as a source IP address). D-GW1 responds to the UE through D-GW3. The shortest data path may be achieved, which may lead to less latency and faster data transfer.

Figure 3:
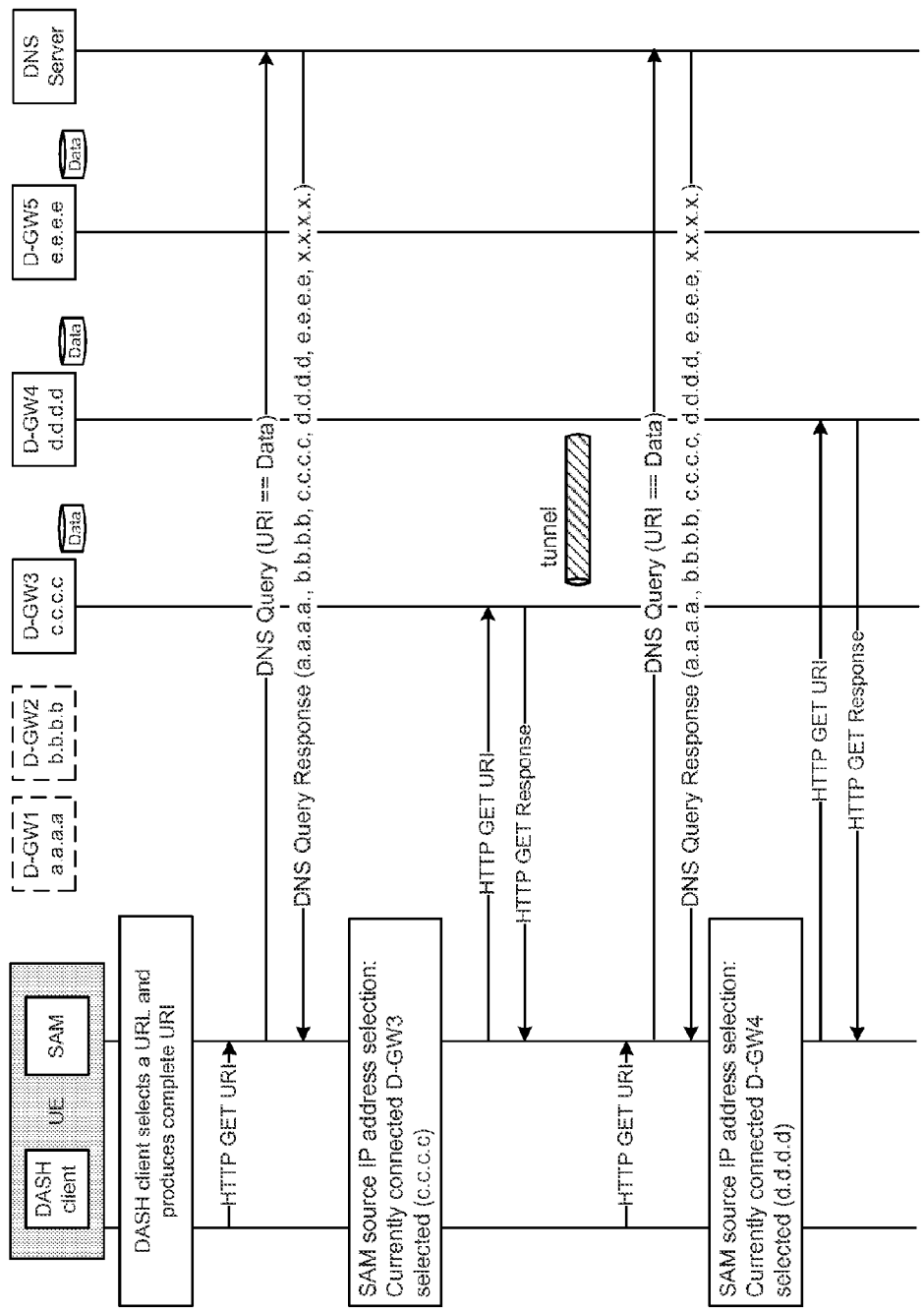
FIG. 3 illustrates an exemplary message chart for anchor node selection by a WTRU when data is replicated, e.g., at two or more DMM gateways.

FIG. 3 illustrates an exemplary message chart fir anchor node selection by a WTRU (labeled UE in FIG. 3) with data replicated, e.g., present at two or more DMM gateways. For example, gateways D-GW3, D-GW4, and D-GW5 all have copies of the same content (e.g., Data). A domain name service (DNS) server is illustrated.

The UE may comprise a dynamic adaptive streaming over HTTP (DASH) client and an access manager (SAM). The DASH client may comprise logic to manage HTTP streaming. The SAM manager may comprise logic to select IP addresses and/or anchor nodes as will be described.

The UE may be anchored to a plurality of gateways through a series of handovers. D-GW1 and D-GW2 are nodes with details removed for simplicity of illustration. D-GW3 represents a node with an address of c.c.c.c. D-GW4 represents a node with an address of d.d.d.d. D-GW5 represents a node with an address of e.e.e.e. At the beginning of the message in FIG. 3, the UE may be connected only to D-GW3, but anchored to D-GW1, D-GW2, and D-GW3.

One or more servers and/or sources of content may provide a media presentation description (MPD) file to the DASH client with uniform resource locators (URLs) of servers comprising encoded segments. The DASH client may parse the MPD file, inspect the URLs (including for example), and select a suitable URL. For each segment, the DASH client may produce a uniform resource identifier (URI) and issue an HTTP GET URI instruction to retrieve corresponding content.

The SAM may make a DNS query (e.g., for Data). The DNS may respond with multiple IP addresses where Data may be available (e.g., a.a.a.a (D-GW1), b.b.b.b (D-GW2), c.c.c.c (D-GW3), d.d.d.d (D-GW4), e.e.e.e (D-GW5), and x.x.x.x (a D-GW that the UE is not in contact with). The SAM may perform the source IP address selection. The SAM may identify the known D-GWs from the DNS response. The SAM may select the current D-GW, if the current D-GW is specified in the obtained IP addresses. If the current D-GW is not specified, a D-GW may be selected, e.g., from which the LIE may have previously obtained an IP address. In the example of FIG. 3, D-GW3, is available. The LIE may issue an HTTP GET URI instruction to currently connected D-GW3.

In the interim, the UE may move to another D-GW (e.g., D-GW4). A tumid may be established between the currently connected D-GW4 and D-GW3 to maintain flow connectivity. One or more of the following may be performed: the DASH client may select a URL, the SAM may make a DNS query and/or the SAM may select a current D-GW, which may be repeated. D-GW4 may be selected as an anchor for the new HTTP GET requests (as Data may be also located at this D-GW4). The shortest data path may be achieved, which may lead to less latency and faster data transfer.

Figure 4:
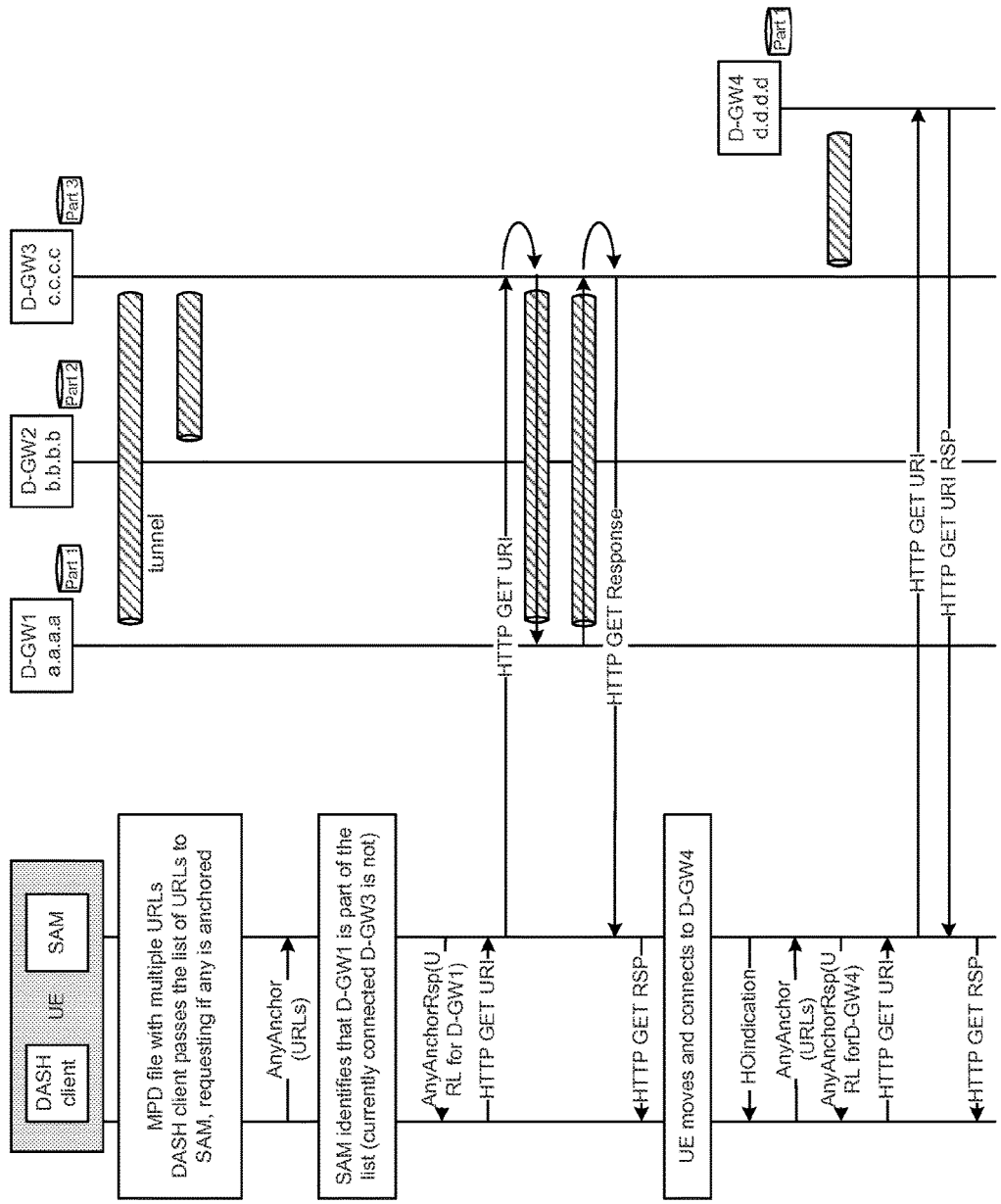
FIG. 4 illustrates an exemplary message chart for anchor node selection by a WTRU when data is distributed, e.g., between one or more DMM gateways.

FIG. 4 illustrates an exemplary message chart for anchor node selection by a WTRU (labeled UE in FIG. 4) with data distributed, e.g., between one or more DMM gateways. For example, D-GW1 represents a node with an address of a.a.a.a, containing Part 1 of data in a database. D-GW2 represents a node with an address of b.b.b.b, containing Part 2 of data in a database. D-GW3 represents a node with an address of c.c.c.c, containing Part 3 of data in a database. The UE may be anchored to all three nodes in FIG. 4, but may be currently connected only to D-GW3. Continuity with the other anchor nodes may be maintained using tunnels. A domain name service (DNS) server is not depicted for simplicity of illustration.

The UE may comprise a dynamic adaptive streaming over HTTP (DASH) client and an access manager (SAM). The DASH client may comprise logic to manage HTTP streaming. The SAM manager may comprise logic to select IP addresses and/or anchor nodes as will be described.

One or more servers and/or sources of content lay provide a media presentation description (MPD) file to the DASH client with uniform resource locators (URLs) of servers comprising encoded segments. The DASH client may parse the MPD file, inspect the URLs, and pass a list of URLs to the SAM requesting identification of local URLs. The SAM may reply with a URL, for example, identified as local. For example, the SAM may expose a function (e.g. SAM_GetLocalURL( ) or AnyAnchor( )) that may be used by the DASH client during the URL selection procedure. Local may be a node to which the UE is currently connected. Local may be a node to which the UE is currently connected or currently anchored. The best URL selection may be performed, e.g., by selecting the URL pointing to the currently connected D-GW or pointing to an anchored D-GW. In FIG. 4, SAM may identify that the desired data may be available at D-GW1 (for example, through a AnyAnchorRsp(URL for D-GW1), if none of the URL D-GWs are returned by SAM, the DASH client may perform its regular URL selection.

The DASH client may make segment queries, e.g., using the local URL (e.g., D-GW1). The LIE may issue an HTTP GET URI instruction to D-GW1 via currently connected D-GW3, redirected through the tunnel to D-GW1 (e.g., since a.a.a.a may be selected as the source IP address). D-GW1 responds to the UE through D-GW3. The shortest data path may be achieved, which may lead to less latency and faster data transfer.

The UE may move and, for example, may connect to another D-GW (e.g., D-GW4). The SAM may inform the DASH client of the handover (e.g. DASH Indication( ) or HOindication( )). The DASH client may pass the list of URLs to the SAM, and may request to check if any of the URLs are local. The SAM may reply with a URL identified as local (e.g., the URL pointing to the currently connected D-GW4 may be specified, since the Part 1 data may be available at D-GW4). The DASH client may use the local URI, for the next segment queries. It may be assumed that the SAM may keep the deprecated IP addresses. The SAM may not release the deprecated IP addresses during a holding period. The SAM may keep the deprecated IP addresses, e.g., after the deprecated IP addresses have been identified as not being used by a flow. The holding period of the IP addresses may be configurable.

As illustrated in FIG. 4, the DASH client may interact with the SAM. The SAM may identify the URLs corresponding to the currently connected D-GW and the other D-GWs where the UE may be anchored. The DASH client may expose a function (that may be used by the SAM, for example, when a HO may take place and/or the UE may be connected to a new anchor D-GW). The DASH client may re-select the URL, e.g., when informed of a new anchor D-GW indication.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

The invention claimed is:

1. A wireless transmit/receive unit (WTRU) comprising:
a memory; and
a processor,
wherein the memory comprises instructions that when executed cause the processor to:
detect a request for an address associated with content;
receive an address list associated with the content; and
select a distributed gateway (D-GW), wherein:
if an address of a currently connected D-GW is included in the address list, the currently connected D-GW is selected, and
if the address of the currently connected D-GW is not in the address list and an address of an anchor D-GW that is not currently connected is included in the address list, the anchor D-GW that is not currently connected is selected, and
if the address of the currently connected D-GW is not in the address list and the address of the anchor D-GW that is not currently connected is not in the address list, the currently connected D-GW is selected.

2. The WTRU of claim 1, wherein the instructions when executed further cause the processor to send a query to a network entity requesting the address list.

3. The WTRU of claim 2, wherein the instructions when executed further cause lire processor to send a message to the selected D-GW requesting the content.

4. The WTRU of claim 1, wherein the instructions when executed further cause the processor to select the D-GW when the WTRU is anchored to one or more distributed gateways.

5. The WTRU of claim 1, wherein the WTRU does not release a deprecated IP address from the address list for a holding period.

6. The WTRU of claim 2, wherein the query is a DNS query and the network entity is a DNS server.

7. The WTRU of claim 1, wherein the instructions comprise instructions associated with at least one of a dynamic adaptive streaming (DASH) entity or a management entity.

8. The WTRU of claim 7, wherein the distributed gateway selection is associated with the management entity.

9. The WTRU of claim 8, wherein the instructions when executed further cause the processor to indicate the distributed gateway selection to the DASH entity.

10. The WTRU of claim 9, wherein the instructions when executed further cause the processor to receive an indication from the DASH entity indicating that the selected distributed gateway is to be used.

11. A method of selecting a distributed gateway (D-GW) for receiving content via a wireless transmit/receive unit (WTRU) comprising:
receiving an address list associated with the content; and
selecting the D-GW, wherein:
if an address of a currently connected D-GW is included in the address list, the currently connected D-GW is selected, and
if the address of the currently connected D-GW is not in the address list and an address of an anchor D-GW that is not currently connected is included in the address list, the anchor D-GW that is not currently connected is selected, and
if the address of the currently connected D-GW is not in the address list and the address of the anchor D-GW that is not currently connected is not in the address list, the currently connected D-GW is selected.

12. The method of claim 11, further comprising sending a query to a network entity requesting the address list.

13. The method of claim 11, further comprising sending a message to tire selected D-GW requesting the content.

14. The method of claim 11, further comprising selecting the when the WTRU is anchored to one or more distributed gateways.

15. The method of claim 11, wherein the WTRU does not release a deprecated IP address from the address list for a holding period.

16. The method of claim 12, wherein the query is a DNS query and the network entity is a DNS server.

17. The method of claim 11, wherein the WTRU comprises at least one of a dynamic adaptive streaming (DASH) entity or a management entity.

18. The method of claim 17, wherein the distributed gateway selection is associated with the management entity.

19. The method of claim 18, further comprising indicating the distributed gateway selection to the DASH entity.

20. The method of claim 19, further comprising receiving an indication from the DASH entity indicating that the selected distributed gateway is to be used.

* * * * *